July 18, 1961
D. F. IRISH
2,992,525
HAY TEDDER
Filed Sept. 1, 1959
2 Sheets-Sheet 1
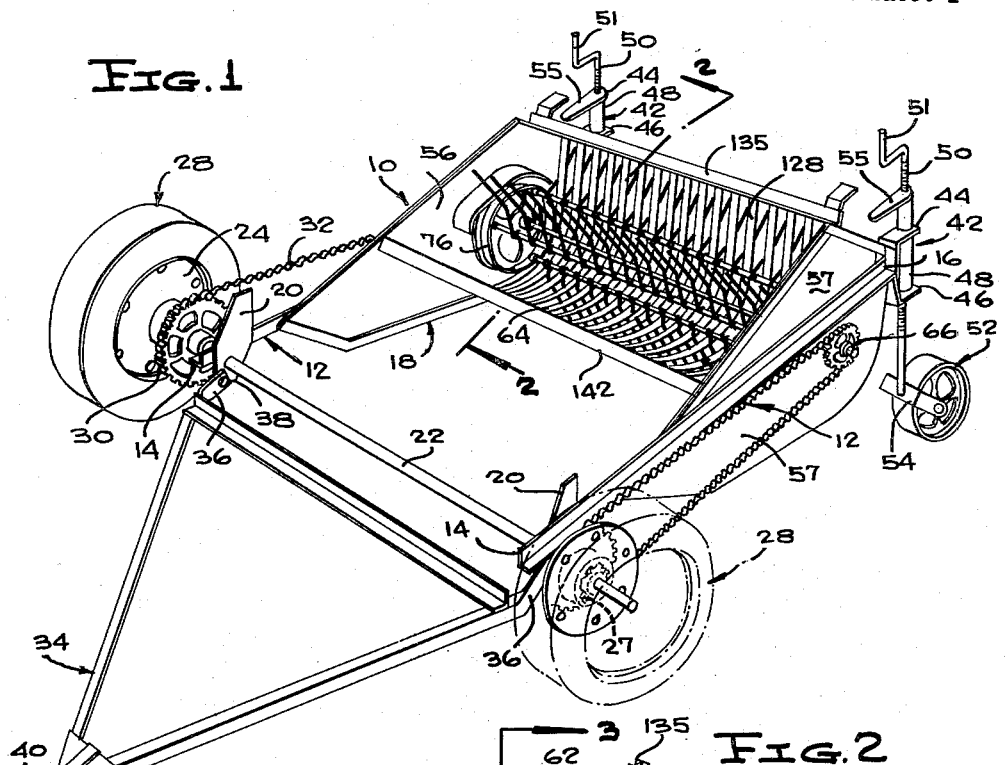
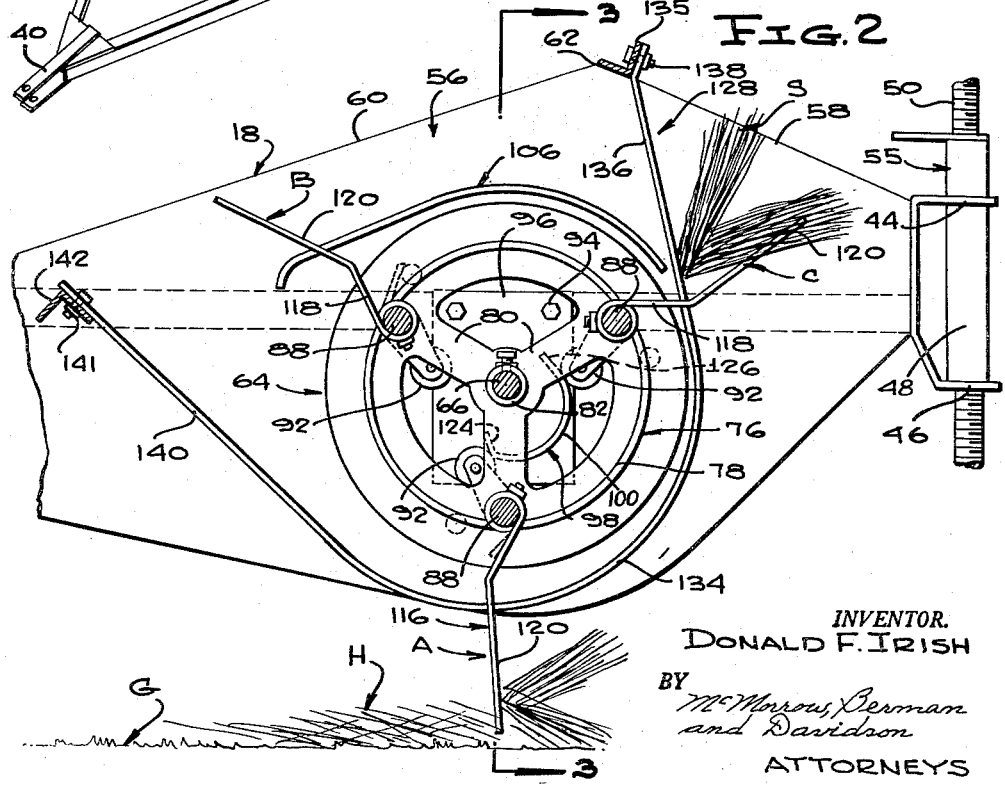
INVENTOR.
DONALD F. IRISH
BY McMorrow, Berman
and Davidson
ATTORNEYS July 18, 1961
D. F. IRISH
2,992,525
HAY TEDDER
Filed Sept. 1, 1959
2 Sheets-Sheet 2
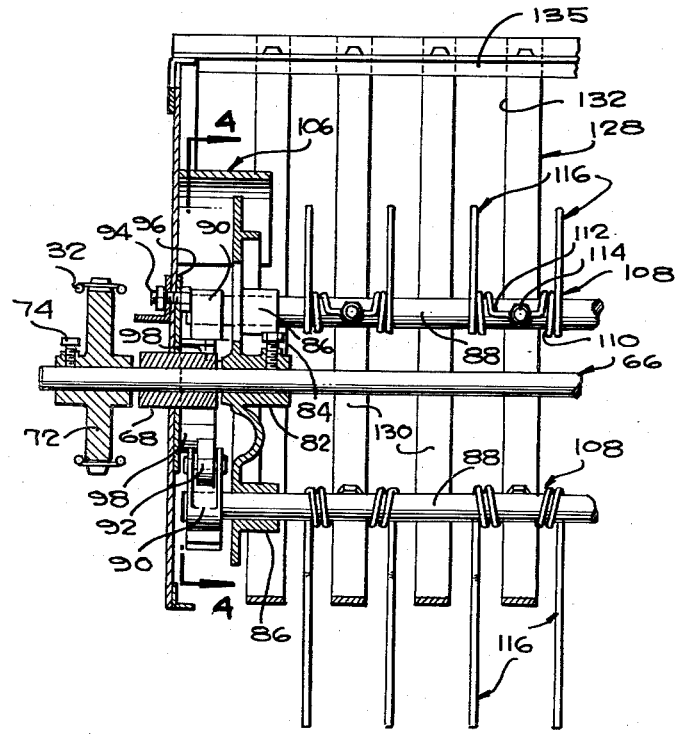
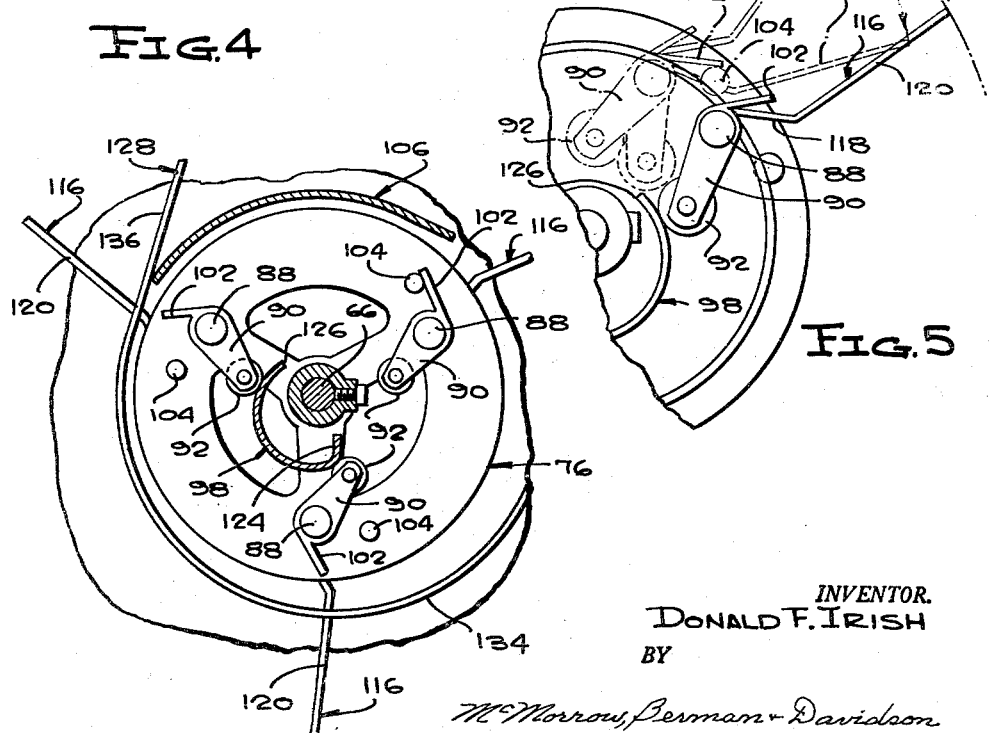
INVENTOR.
DONALD F. IRISH
BY
McMorrow, Berman & Davidson
ATTORNEYS United States Patent Office 2,992,525
Patented July 18, 1961

2,992,525
HAY TEDDER
Donald F. Irish, Fletcher, Vt.
Filed Sept. 1, 1959, Ser. No. 837,501
3 Claims. (Cl. 56—372)

This invention relates to a novel hay tedder.

The primary object of the invention is to provide a more efficient and longer life hay tedder which is simpler in construction, lighter in weight, and less expensive to manufacture than existing hay tedders; and which can be used for tedding grasses other than hay.

Another object of the invention is to provide a device of the character indicated above which operates efficiently over flat ground, over uneven ground, and upon hay windrows, and whose action handles the hay in a manner to separate the stalks for greater exposure to sun and air, and hence quicker and more thorough drying of the hay.

A further object of the invention is to provide a device of the character indicated above which has a reel on which cam-operated fingers or forks are journaled, to occupy starting positions wherein the fingers or forks pick up hay, or other stalks, at the butt ends of the stalks, intermediate positions wherein the fingers or forks lift the stalks, and final discharge positions wherein a substantial proportion of the stalks are bent as they are released, in a manner to give the stalks nearly perpendicular erected positions wherein they have maximum exposure to sun and air, before dropping off behind the tedder.

A still further object of the invention is to provide, in a device of the character indicated above, cushioned ground-engaging wheels, which are directly connected to the reel, and vertically adjustable trailing ground-engaging wheels which are adjustable to give the tedder frame the angulation relative to the ground by which means the correct effective angles to the ground of the fingers or forks are produced.

Other important objects and advantageous features of the invention will be apparent from the following description and the accompanying drawings, wherein, for purposes of illustration only, a specific form of the invention is set forth in detail.

In the drawings:

FIGURE 1 is a front perspective view of a tedder of the invention;

FIGURE 2 is an enlarged fragmentary vertical longitudinal section taken on the line 2—2 of FIGURE 1, and showing starting, intermediate, and final positions of forks or fingers;

FIGURE 3 is a fragmentary horizontal section taken on the line 3—3 of FIGURE 2;

FIGURE 4 is a further enlarged fragmentary vertical longitudinal section taken on the line 4—4 of FIGURE 3; and FIGURE 5 is a fragmentary view showing cammed positions of figures.

Referring in detail to the drawings, wherein like numerals designate like parts throughout the several views, the illustrated tedder comprises a frame 10 which is composed of a pair of horizontal, longitudinally elongated side members, in the form of angle irons 12, having forward and rear ends 14 and 16, respectively, and disposed between the angle irons 12 is a transversely elongated horizontal trough 18, which is fixed at its ends to related irons 12.

Vertically elongated bracket plates 20 are fixed to the laterally inward sides of the angle irons 12, at the forward ends 14, and extend above and below the angle irons. A transverse axle 22 is journaled at its ends through the plates 20, below the angle irons, and right- and left-hand wheel mounting discs 24 and 26 are journalled on and ratchet clutched, as by a ratchet and clutch mechanism as exemplified by Patent No. 1,603,190 and indicated at 27, on the axle 22 outwardly of the plates, to which pneumatic tired ground-engaging drive wheels 28 are secured, in suitable manner. Fixed on the axle 22 at a point between and spaced from the right-hand wheel mounting disc 24 and the adjacent frame angle iron 12, is a sprocket wheel 30, over which is trained a sprocket chain 32.

A preferably triangular drawbar 34 has rearwardly extending ears 36 which are pivotally secured to the lower parts of the bracket plates 20, at the inward sides thereof, as indicated at 38, the drawbar having a clevis hitch 40 on its forward end, for connection to any suitable tractor vehicle (not shown).

Fixed on the rear ends 16 of the angle irons 12 are U-shaped brackets 42 having upper and lower arms 44 and 46, respectively, between which vertical threaded sleeves 48 are secured, and vertical threaded shafts 50 extend downwardly through the sleeves 48, and have crank handles 51 on their upper ends, for rotating the shafts in the sleeves to effect the desired vertical adjustments of caster wheels 52, which are journaled in offset forks 54 on the lower ends of the shafts 50. Lock nuts 55 are threaded on the shafts to be turned down against the brackets 42 so as to hold the adjustments of the shafts.

The trough 18 comprises vertical, longitudinally elongated forwardly tapered left- and right-hand side plates 56 and 57, which are suitably secured to the inward sides of the frame angle irons 12. The side plates have upper edges which comprise rear rearwardly declining portions 58 and forward declining portions 60 which meet in an apex 62 which is spaced above the angle iron 12, as seen in FIGURE 2. The trough 18 has a slotted bottom or cage, as hereinafter described.

Positioned in the trough 18 and extending thereacross is a reel, generally designated 64, which comprises a reel shaft 66 which is journaled through the side plates 56 and 57 in bearings 68, the shaft 66 having on its right-hand end a sprocket wheel 72, secured as by a set screw 74, over which the chain 32 is trained. As shown in FIGURE 2, the location of the shaft 66 is below the level of the frame side members 12 and slightly forwardly of the apex portions 62 of the trough side plates.

Circular three-spoke reel heads of identical structure are on the left-hand and right-hand ends of the shaft 66. Since the heads are of identical structure, only the right-hand reel head will be specifically described. This right-hand reel head is indicated by the numeral 76 and has a rim portion 78, connected to three equally circumferentially spaced spokes 80 extending from a hub 82, which is engaged on the shaft and secured thereto, as by means of a set screw 84, at a location close to but spaced from the right-hand trough side plate 56. Fixed on the rim portion 78 of the reel head 76 and extending laterally inwardly therefrom, at the locations of the spokes 80, are tubular bushings 86, whose bores extend through the reel heads, and through which are journaled rotary finger or fork carrying shafts 88, which extend between the reel heads. Fixed on the shafts 88 and spaced between the reel head 76 and the adjacent trough side plate 56, are radial cam follower arms 90, having rollers 92 on their free ends. Fixed, as indicated at 94, to the laterally inward side of the adjacent side plate is a cam mounting plate 96, which has fixed on its inward side a circumferential curved cam 98, on whose radially outward side 100 the rollers 92 bear.

The cam 98 is substantially arcuate, has a radius of curvature which is downwardly offset with respect to the axis of the reel shaft 66 and is disposed at a location behind the reel shaft, as shown in FIGURE 2. The reel rotates in counterclockwise direction, as seen in FIGURE 2, and clockwise, as seen in FIGURE 4, and the cam follower arms 90 have stop lugs 102 which are angled away from the direction of rotation of the reel, to engage stop bosses 104 which project from the laterally outward side of the reel head 76, and are located behind the related shafts 88. A protective shield plate 106 is fixed on the laterally inward side of the right-hand side plate and overlies the cam structure and the reel head 76.

Mounted on the shafts 88, at similarly spaced locations therealong, are fork assemblies 108, each assembly 108 comprising a coil 110 circumposed on a shaft 88, having a midportion 112 secured by a screw 114 to the shaft 88, and having parallel spaced fingers 116 on the ends of the coil. The fingers 116 are specially formed, with straight inner portions 118 which are tangential to the shaft 88, as shown in FIGURE 2, and straight outer end portions 120 which are angled relative to the inner portions 118 in the direction of rotation of the reel 64, at an angle of about forty-five degrees. The fingers 116 are long enough so that their free ends 122 reach close to the surface of the ground G, to engage the butt ends of and pick up strands or stalks of such as hay H.

As shown in FIGURE 2, the finger A is in pendant perpendicular starting position, to contact the hay H, with the related cam follower roller 42 engaged with the leading end 124 of the cam 48, the finger B is in an intermediate portion wherein its cam follower roller is out of engagement with the cam, and the finger C is in its final position, preliminary to being tripped, wherein its cam follower roller is engaged with the cam 48 at a point near the trailing end 126 of the cam. As the reel 64 is turned beyond the position thereof shown in FIGURE 2, and the cam follower of the finger C moves off the trailing end 126 of the cam, the finger C is tripped to fall rearwardly, as shown in phantom lines in FIGURE 5, so that the outer end portion 120 of the finger C assumes an acutely angled relation to the reel 64 and its stop lug 102 engaged in a related stop boss 104, instead of the normal or radial relation thereto of the finger C in its starting position. The effect of this rearward and downward tilting or tripping of the finger C, and of succeeding fingers, is to bend a substantial proportion of the stalks forwardly and upwardly, to assume substantially erect perpendicular positions, wherein these stalks are separated from other stalks, and are exposed, to sun and air, above the reel 64.

The above described erection of the stalks is accomplished, as shown in FIGURE 2, by the forward and upward pushing action of the outer end portion 120 of the finger C, toward the rear side of a slotted cage, generally designated 128, which forms the bottom of the trough 18, and which extends between and is fixed at its ends to the trough side plates 56 and 57. As shown in FIGURES 2 and 3, the cage 128 comprises a plurality of laterally spaced flat bars 130, defining vertical longitudinal slots 132 between adjacent bars 130, through which extend fingers 116 of the fork assemblies 108. The bars 130 have downwardly bowed, substantially arcuate intermediate portions 134 which are located beneath and close to the underpart of the reel 64 and substantially concentric therewith. The bars 130 have vertical portions 136 on the rear end of the intermediate portions 134, which form a fence which reaches forwardly and upwardly to and are fixed at their upper ends, as indicated at 138 to a rear trough cross bar 135 which is secured to the side plate apex portion 62; and forwardly inclined forward portions 140 which are fixed at their rear ends, as indicated at 142, to a forward cross bar which extends between and is fixed to the trough side plates at points spaced forwardly of the reel 64. As shown in FIGURE 2, forward and upward movement of the outer end portion 120 of a finger 116 extending rearwardly through the fence portion 136 of the cage, toward the rear side of the fence portion 136, pushes stalks S to erect position. The cage 128 also serves to protect the reel 64 from interference and damage by stones and other obstructions on the ground G, and to push the stalks off the fingers 116, for their erection in the manner above described.

It is to be noted that the presence and arrangement of the cushion tired wheels, protects the tedder against vibration damage, and eliminates such excessive shaking of the tedder, as in travelling over rough ground, as might otherwise disturb the stability and accuracy of functioning of the fingers 116; and that the presence and arrangement of the adjustable caster wheels supports and levels the tedder, especially in travel over rough ground, so as to prevent ground contact damage to the reel assembly. It is further to be observed that the forwardly inclined bar portions 140 of the cage 128 serves as depressing and positioning means, as the tedder is passed over a windrow, of such as cut hay, so that the stalks of the windrow are efficiently picked up by the fingers 116, and the tedder is not hampered in its action or in its forward travel, as long as the wheels 28 are disposed at the opposite sides of the windrow.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A tedder comprising a horizontal frame having side members having forward and rear ends, a transverse axle journaled on and extending between said side members at said forward ends, ground engaging drive wheels clutched on said axle outside of the side members, vertically adjustable caster wheels on and depending from the frame at the rear end of the side members a transverse trough comprising side plates extending along said frame side members, a reel comprising a horizontal reel shaft journaled at its ends in said side plates and extending across the trough, said reel shaft having a fixed sprocket wheel thereon outside one of said side plates, said axle having a fixed sprocket thereon, a chain trained over said sprocket wheels, said reel shaft having a left-hand and a right-hand end, reel heads fixed on said right and left-hand ends of said shaft and adjacent to related side plates, circumferentially spaced rotary shafts extending between and journaled through the reel heads, and fork assemblies mounted on and spaced along said rotary shafts, said fork assemblies being fixed on the rotary shafts, cam follower arms on and extending radially from and fixed to said rotary shafts, said follower arms being located between said one side plate and said first reel head and having free ends, an arcuate cam fixed on and extending inwardly from said one side plate into the paths of the cam follower arms, said cam being circumferential with respect to and spaced from the reel shaft and having leading and trailing ends, said cam having an outer cam surface with which the free ends of said arms are at times engageable, said fork assemblies having fingers extending radially outwardly from the rotary shafts, and a cage secured to said trough side plates and extending therebetween and affording a bottom for the trough, said cage having an arcuate lower portion substantially concentric with the underpart of the reel and a flat upstanding rear fence portion behind the reel and rising thereabove, said cage having longitudinal slots through which the fingers work, said fingers then reaching rearwardly beyond the upstanding fence portion, said reel being rotated in a direction to move fingers upwardly and forwardly toward said upstanding fence portion so as to push hay stalks picked up off the ground into erect positions behind and against said upstanding fence portion.

2. A tedder comprising a horizontal frame having side members having forward and rear ends, a transverse axle journaled on and extending between said side members at said forward ends, ground engaging drive wheels clutched on said axle outside of the side members, vertically adjustable caster wheels on and depending from the frame at the rear end of the side members, a transverse trough comprising side plates extending along said frame side members, a reel comprising a horizontal reel shaft journaled at its ends in said side plates and extending across the trough, said reel shaft having a fixed sprocket wheel thereon outside one of said side plates, said axle having a fixed sprocket thereon, a chain trained over said sprocket wheels, said reel shaft having a left-hand and a right-hand end, reel heads fixed on said right and left-hand ends of said shaft and adjacent to related side plates, circumferentially spaced rotary shafts extending between and journaled through the reel heads, and fork assemblies mounted on and spaced along said rotary shafts, said fork assemblies being fixed on the rotary shafts, cam follower arms on and extending radially from and fixed to said rotary shafts, said follower arms being located between said one side plate and said first reel head and having free ends, an arcuate cam fixed on and extending inwardly from said one side plate into the paths of the cam follower arms, said cam being circumferential with respect to and spaced from the reel shaft and having leading and trailing ends, said cam having an outer cam surface with which the free ends of said arms are at times engageable, said fork assemblies having fingers extending radially outwardly from the rotary shafts, and a cage secured to said trough side plates and extending therebetween and affording a bottom for the trough, said cage having a flat arcuate lower portion substantially concentric with the underpart of the reel and an upstanding rear fence portion behind the reel and rising thereabove, said cage having longitudinal slots through which the fingers work, said fingers then reaching rearwardly beyond the upstanding fence portion, said reel being rotated in a direction to move fingers upwardly and forwardly toward said upstanding fence portion so as to push hay stalks picked up off the ground into erect positions behind and against said upstanding fence portion, the cam followers related to some of the fingers being out of engagement with said cam in starting and intermediate positions of fingers and being engaged with the cam in final positions of fingers wherein certain fingers are in a first upwardly angled relation to and behind said upstanding fence portion, the cam follower arms of said certain fingers being arranged to drop off the trailing end of the cam, as said certain fingers move toward said upstanding fence portion, so as to gravitationally assume a second greater angular relation to said upstanding fence portion on further approach thereto.

3. In a tedder, a trough comprising spaced first and second side plates, a longitudinally slotted cage extending between the side plates and forming a bottom for the trough, said cage having an arcuate lower portion and an upstanding rear fence portion, a reel positioned in and across the trough in front of said fence and in said lower portion, said reel having a reel shaft journaled at its ends in related side plates, reel heads fixed on the reel shaft adjacent to related side plates, circumferentially spaced rotary shafts extending between and journaled in related reel heads, said rotary shafts having fixed thereon radially outwardly extending fingers extending through the slots of the cage, and means for rotating said reel shaft in a direction to move fingers upwardly and toward said upstanding fence portion from behind the fence portion, a circumferential cam on said first side plate, cam follower arms fixed on the rotary shafts and sometimes engageable with said cam, said cam having leading and trailing ends, the follower arms when disengaged with the cam leaving the rotary shafts free to be rotated by gravity, the trailing end of the cam being located to be engaged by a cam follower arm to hold one rotary shaft in a position in which fingers thereon extend rearwardly through said fence portion at an upward approach angle to the fence portion, the trailing end of the cam being positioned uppermost wherein the cam follower arm of said one shaft drops off the trailing end of the cam and the related fingers assume greater downward angulation relative to the fence portion on approach to the fence portion, and stop means on the cam follower of said one rotary shaft and on the first reel head for holding the related fingers in such greater angulation.

References Cited in the file of this patent

UNITED STATES PATENTS

| | | |
|---|---|---|
| 720,098 | Bamford | Feb. 10, 1903 |
| 1,047,326 | Stewart | Dec. 17, 1912 |
| 2,532,652 | Wray | Dec. 5, 1950 |
| 2,639,570 | Greene | May 26, 1953 |
| 2,718,746 | Prischmann | Sept. 27, 1955 |
| 2,956,387 | Flinchbaugh et al. | Oct. 18, 1960 |